Aug. 28, 1956   B. T. HENSGEN ET AL   2,760,248
CHEESE CUTTING MACHINE
Filed Jan. 12, 1954   2 Sheets-Sheet 1

INVENTORS
BERNARD T. HENSGEN
WALTER H. BELAND
BY R. D. Story
ATTORNEY

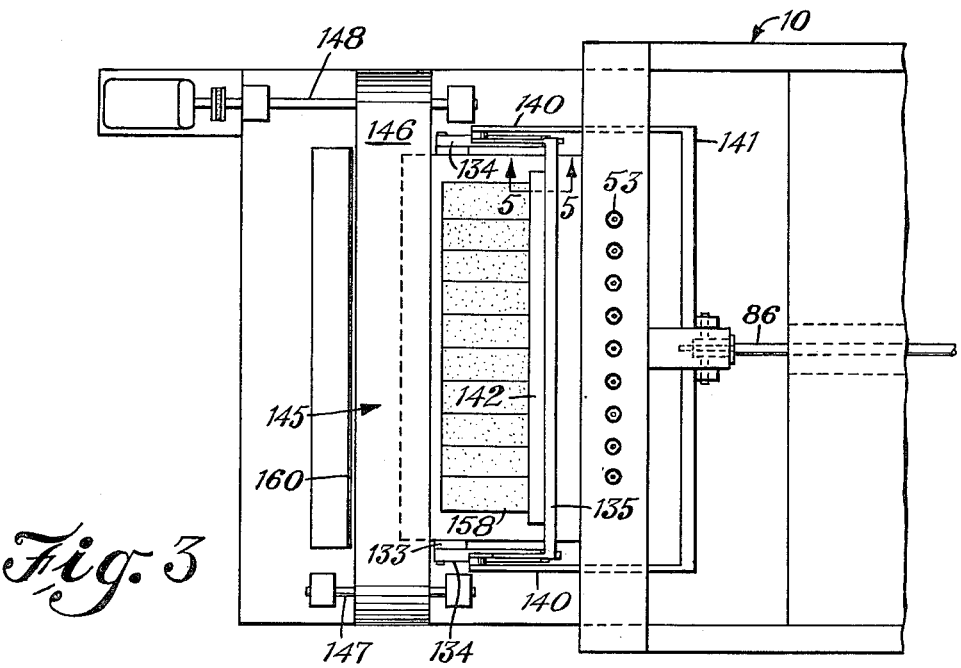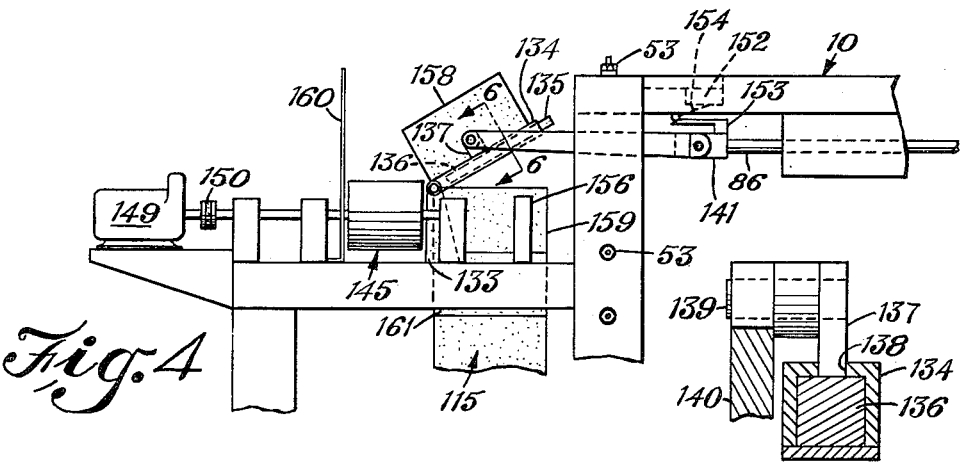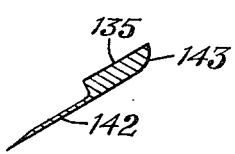

United States Patent Office 2,760,248
Patented Aug. 28, 1956

2,760,248

CHEESE CUTTING MACHINE

Bernard T. Hensgen and Walter H. Beland, Chicago, Ill., assignors to Swift & Company, Chicago, Ill., a corporation of Illinois Application January 12, 1954, Serial No. 403,593

15 Claims. (Cl. 25—105)

The present invention relates to a device for dividing a block of product into a plurality of smaller units.

While the present invention was devised for dividing large blocks of cheese into smaller pieces it obviously could be used with numerous other edible and inedible products. Butter and margarine could be mentioned as a few of the various other edible products with which the invention might be advantageously used and a plastic clay mixture would be an example of a non-edible product.

In the manufacture of cheese there are numerous advantages in producing the product in large units. In the first place the hoops and forms need not be so numerous. In the second place the loss due to the removal of the rind is substantially less. Furthermore, one is able to control the shape and weight of a block much more closely if it is cut from a larger block rather than trying to cast it in a smaller block. Obviously the smaller blocks will be of a size more suitable for retail sale to consumers and, with the advent of presliced packaged cheese, can be made of a size suitable for slicing into sandwich-size pieces.

The principal object of the present invention is to provide a machine for quickly and accurately cutting a block of cheese into a plurality of smaller units and for starting the units advancing to a subsequent station in serial order where they may be further processed, such as either wrapping the units as they are for retail sale or for further cutting into slices. This is accomplished by cutting the block horizontally to produce a stack of units and then placing the units in serial order onto a conveyor starting with the uppermost units of the stack. Depending upon the size of the block, the block may also be cut vertically at the same time it is cut horizontally to produce more than one vertical stack of units. A particular advantage is that these operations are not only done quickly and easily but are performed entirely by machinery, thus holding down production costs, and in the case of food products, facilitating the meeting of sanitary requirements.

The ability of the invention to not only divide the block into a plurality of stacks of units but then to rapidly place those units on a conveyor in serial order is an outstanding advantage, because the units are then received at the next machine, whether it be a wrapping machine, a unit slicer, etc., one at a time, which permits the next machine to receive the units and perform its operation on them without any intermediate handling of the units to arrange them in such a serial order.

A further advantage of the invention is the simplicity of the apparatus required. The average mechanic can maintain the machine without the necessity for providing technical specialists. Furthermore, by reason of this simplicity there is little to get out of order and produce any malfunctioning. It is completely safe because there is no necessity for an operator performing any operation in conjunction with the machine after it has been loaded and started.

Further objects and advantages will become apparent from the following description taken in conjunction with the drawings in which:

Figure 3 is a plan view of one end of the machine of Figures 1 and 2, illustrating an alternative structure for loading the cut units onto the take-off conveyor;

Figure 4 is a partial elevation of the alternative structure of Figure 3;

Figure 5 is a section taken at line 5—5 of Figure 3; and

Figure 6 is a section taken at line 6—6 of Figure 4.

Figure 1:
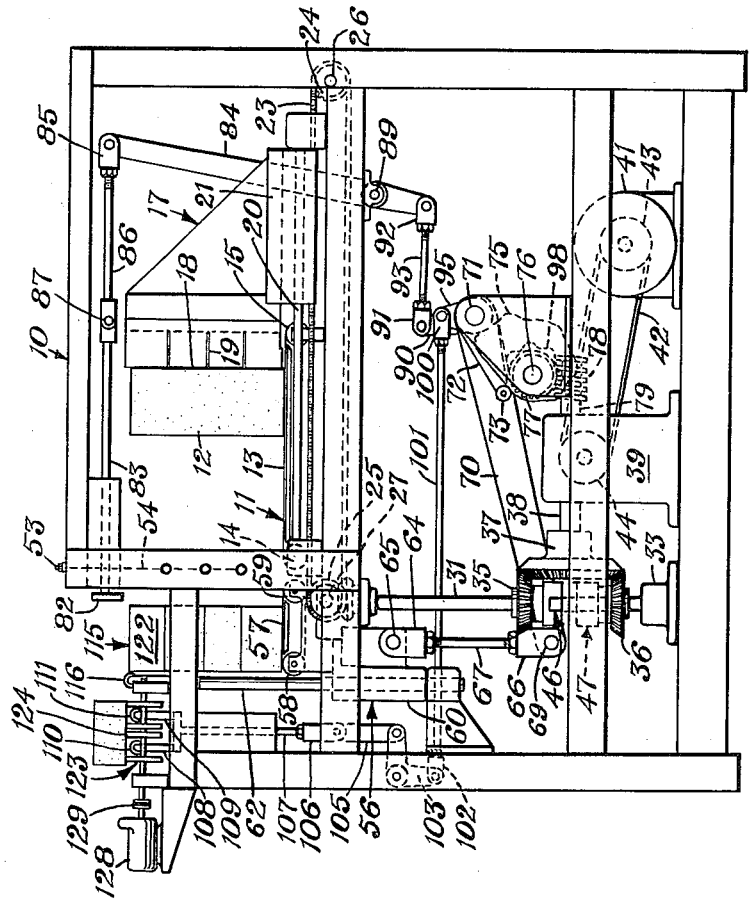
Figure 1 is a side elevation of an embodiment of the invention.
Figure 2:
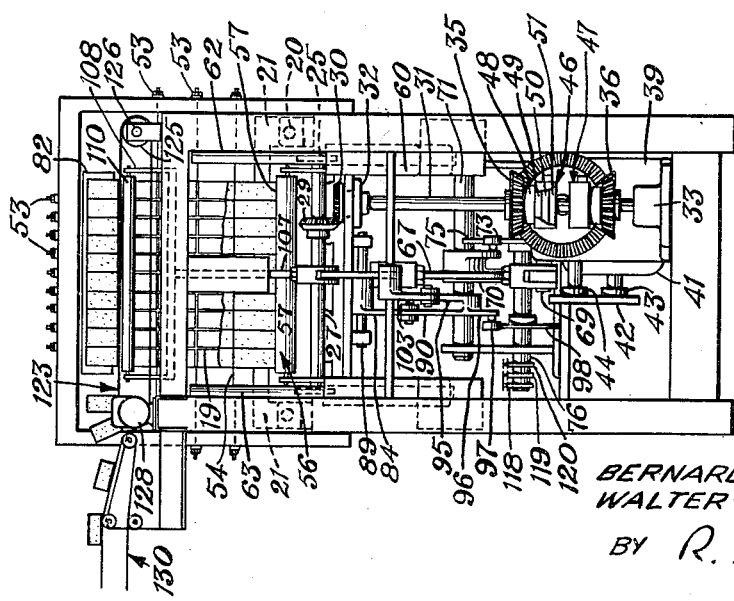
Figure 2 is an end elevation of the embodiment of Figure 1.

Referring to the embodiment of Figures 1 and 2, the structure is mounted on a frame, generally 10. A conveyor generally 11 is employed to support the block of product 12. Conveyor 11 includes a belt 13 mounted on a pair of rollers 14 and 15. The axles of the rollers are journaled in portions of frame 10.

A block pusher generally 17 is positioned at the rear of block 12. In the illustrated embodiment the forward face 18 of pusher 17 has three horizontal slots 19 and nine vertical slots 19 therein, although the exact number will vary from machine to machine. Pusher 17 is supported on guides 20 secured to frame 10. Extending arms 21 of pusher 17 have horizontal openings therein through which guides 20 pass to support the pusher and to permit it to move on the guides.

Arms 21 are attached to the top run of chains 23 by links, not shown. Chains 23 travel over sprockets 24 and 25 mounted on shafts 26 and 27, respectively, journaled in frame 10. A bevel gear 29 is secured to shaft 27 and meshes with a second bevel gear 30 on vertical shaft 31. Shaft 31 is mounted in bearings 32 and 33 on frame 10. A pair of bevel gears 35 and 36 are rotatably mounted on shaft 31 and mesh with a bevel gear 37 on the output shaft 38 of speed reducer 39. Speed reducer 39 is driven by a motor 41 through a belt 42 mounted on pulleys 43 and 44.

Each of gears 35 and 36 has an electric clutch generally 46 and 47, respectively. Referring to Figure 2, the armature drive hub 48 of clutch 46 and the armature 49 are attached to gear 35, while the magnet 50 and the magnet drive hub 51 are attached to shaft 31. The structure of clutch 47 corresponds to that described for clutch 46.

Forwardly of block 12 is a wire grid employed to cut the block into a plurality of stacks of units. A plurality of wire chucks 53 on frame 10 hold wires 54. In the illustrated embodiment there are three horizontal wires 54, each held with two chucks 53, and nine vertical wires 54 similarly held by chucks 53. Horizontal and vertical slots 19 in the face 18 of pusher 17 are positioned to pass about wires 54.

The stack supporting means generally 56 comprises a conveyor belt 57 mounted on rollers 58 and 59. The axles of rollers 58 and 59 are journaled in a support 60. The ends of support 60 have vertical openings therein to fit about a pair of vertical guides 62 and 63 on frame 10. Clevis 64 is secured to support 60 by means of a pin 65 and to a second clevis 66 by a rod 67. A pin 69 connects clevis 66 with an arm 70 rotatably mounted on shaft 71. Arm 70 is formed integrally with a second arm 72 having a cam follower 73 on the end thereof. Cam follower 73 rides on the surface of a cam 75 attached to shaft 76. Shaft 76 is journaled in frame 10 and also carries a gear 77 which meshes with a worm gear 78 attached to a second output shaft 79 of speed reducer 39.

A pusher 82 is used to displace the top cut units from the stack thereof. Pusher 82 is attached to a pair of rods 83 slidably mounted in frame 10 and connected to a lever 84 through a clevis 85, rod 86, and a cross member 87. Lever 84 is pivotally mounted on frame 10 by a shaft 89, with the lower end of the lever being connected to an arm 90, rotatably mounted on shaft 71, by means of a pair of clevises 91 and 92 connected together by a rod 93.

Arm 90 is formed integrally with two more arms 95 and 96. Arm 96 carries a cam follower 97 riding on a cam 98 secured to shaft 76. Arm 95 carries a clevis 100 connected by a rod 101 to a clevis 102 on one arm of a rocker 103. The other arm of rocker 103 is pinned to a link 105 attached to a clevis 106. Clevis 106 is secured to the lower end of a lifter rod 107 slidably held in frame 10. At the upper end of lifter rod 107 are mounted a pair of spaced U shaped brackets 108 and 109 each rotatably supporting a roller 110 and 111, respectively.

At one side of the stack of units generally 115 formed from the cut block, and between the stack of units 115 and roller 111, is another roller 116 rotatably supported by frame 10.

Three cams 118, 119 and 120, respectively, are attached to shaft 76 each actuating an electrical switch. The switch for cam 118 is wired in series with a source of power and the magnet of clutch 46. The switch actuated by cam 119 is similarly wired in series with a source of power and the magnet of clutch 47. The switch actuated by cam 120 is in parallel with a spring return starting switch, not shown, with the two switches being in series with a source of power and motor 41.

Before starting the machine a block 12 of product is placed on the machine by a conveyor, not shown, or by a hand operation. The starting switch for motor 41 is pressed and as soon as the motor commences to turn shaft 76, cam 120 actuates the switch associated therewith to keep the motor operating for one revolution of shaft 76. This allows the motor starting switch to be released almost immediately.

Gear 37 rotates both of gears 35 and 36 which turn freely on shaft 31. Cam 118 and its associated switch closes the circuit through the magnet of clutch 46 to engage the clutch, thus causing shaft 31 to rotate with gear 35. The rotation of shaft 31 turns shaft 27 and moves the top run of chains 23 toward the cutting grid thus pulling the pusher 17 toward the cutting grid. Block 12 rides freely on conveyor 11 and is pushed through the grid dividing the block into a plurality of units which are stacked on the unit supporting means 56 in the manner illustrated at 115 in Figure 1.

Cam 118 then actuates its associated switch to deenergize the magnet of the top clutch 46 and at the same time cam 119 actuates its associated switch to energize the magnet of clutch 47 to cause shaft 31 to rotate with gear 36. This reverses the direction of chain 23 and returns the pusher 17 to the position illustrated in Figure 1, at which time clutch 47 is again deenergized to stop the pusher.

Shaft 76 is rotated in a clockwise direction as viewed in Figure 1. After a stack of units 115 has been placed on supporting means 56 as just described, cam 75 reaches the point at which the first and lowermost of the five high spots contacts cam follower 73. The first high spot turns arm 70 in a clockwise direction a distance sufficient to raise supporting means 56 and stack 115 so that the top row 122 of units in stack 115 is positioned in front of pusher 82. Cam 98 then moves cam follower 97 to turn arms 90, 95, and 96 in a clockwise direction as viewed in Figure 1. The movement of arm 95 pulls rod 101 to the right, in Figure 1, rotating rocker 103 to raise rollers 110 and 111. The movement of arm 90 pivots lever 84 to drive pusher 82 to the left, thus advancing the top row of units 122 to the left across roller 116 and onto rollers 110 and 111. At this point cam follower 97 again drops into a low spot on cam 98, reversing the movements of arms 90, 95, and 96 to lower rollers 110 and 111 and the units 122 onto a discharge conveyor 123, and retracting pusher 82.

The discharge conveyor generally 123 comprises a plurality of spaced belts 124 between which are positioned the rollers 110 and 111. Belts 124 are mounted on pulleys 125 secured to shafts 126 journaled in frame 10. One of shafts 126 is connected to a gear head motor 128 by a coupling 129. Conveyor 123 is constantly moving and as soon as rollers 110 and 111 are moved below the conveying surface of belts 124 the units are picked up by the conveyor to move the units to the left in Figure 2. As the units reach the end of conveyor 123 they are dropped onto a second conveyor generally 130 which is moving at a higher speed than is conveyor 123 so that the units on conveyor 130 are spaced from each other for easy handling at subsequent stations.

As soon as the top row of units 122 is removed from stack 115, as just explained, cam 75 reaches the second from the lowest of the five high spots to raise supporting means 56 another step and position the next row of units in front of pusher 82. These are then transferred to conveyor 123 in the same manner and the process is repeated for each of the horizontal rows of units in stack 115, whereupon the supporting means 56 is again lowered to the position illustrated in Figure 1 by cam 75. After shaft 76 has made one complete revolution, cam 120 on shaft 76 opens the associated switch to deenergize motor 41 and stop the machine.

Figures 3 through 6 illustrate an alternative embodiment for removing the units from stack 115 after they have been cut in the same manner as described with respect to the embodiment of Figures 1 and 2. In this instance a bracket 133 secured to frame 10 pivotally supports a pair of guides 134, one at each end of the stack 115. A yoke 135 has the ends 136 thereof movably mounted in guides 134. A finger 137 integral with the ends 136 of yoke 135 projects upwardly therefrom through a slot 138 in guides 134. Fingers 137 are connected by pins 139 to arms 140 secured at the ends of cross member 141. Cross member 141 is attached to rod 86 previously described.

Projecting forwardly from a side of yoke 135 is a knifelike blade 142. Preferably the lower rearward edge of yoke 135 is rounded as seen at 143 in Figure 5.

Discharge conveyor generally 145 in the present embodiment can take the form of a solid belt 146. Belt 146 is mounted on suitable pulleys, not shown, secured to shafts 147 and 148 journaled in frame 10. Shaft 148 is attached to a gear head motor 149 by a coupling 150.

A snap action switch 152 is actuated by a cam 153 secured to cross member 141. The snap action switch 152 is positioned with the actuating lever 154 thereof in the path of the cam 153 as the cam reciprocates with the cross member 141. Snap action switch 152 is a normally closed switch and is connected in series with motor 149 and a suitable source of power. Thus motor 149 is operating except when the switch is actuated by cam 153 engaging actuating lever 154.

When the machine is at rest rod 86 is at the right hand end of its stroke, as previously described, and yoke 135 is thereby pulled to the right out of the vertical path of the stack of units 115. In this position guides 134 are horizontal and rest on upwardly projecting portions 156 of frame 10. After the stack of units has been cut and placed on supporting means 56 (Figures 1 and 2) the stack of units 115 is raised so that the line of juncture between the top row of units 158 and the second horizontal row of units 159 is directly opposite blades 142 of yoke 135. Thus when rod 86 moves to the left in Figures 1 through 4, the blade enters between the top row 158 and the second row 159 to insert the blade 142 under the top row of units 158.

Slot 138 in guides 134 extends only part of the length of the guides 134 and after the blade 142 has been inserted under the top row of units 158, finger 137 reaches the end of the slot 138. This provides a stop means to prevent further movement of the yoke 135 in guides 134. Continued movement of rod 86 to the left pivots the guides upwardly to the position illustrated in Figure 4. At this point switch 152 is actuated to stop motor 149 and cause conveyor 145 to be stationary. Further movement of rod 86 continues the pivoting of the guides 134 and yoke 135 to cause the top row of units 158 to fall onto conveyor 145. A stop 160 may be employed at the opposite side of the conveyor 145 to prevent the units falling from that side of the conveyor.

Rod 86 then moves to the right lowering the guides and yoke back in a horizontal position. When cam 153 clears actuating lever 154 switch 152 is closed to energize motor 149 and start conveyor 145 moving the deposited row of units 158 from the machine. The stack 115 is again raised to position the line of juncture between the next row of units 159 and the following row of units 161 opposite blade 142. As in the case of the embodiment of Figures 1 and 2, each row of units is deposited on the conveyor 145 and when all have been removed from the supporting means, it returns to its lower position and the machine stops.

The foregoing description of a specific embodiment is for the purpose of compliance with 35 U. S. C. 112, and we do not desire to be limited to the exact details shown and described, for obvious modifications will occur to a person skilled in the art.

We claim:

1. A device for dividing a block of product including means to horizontally divide a block of product into units to produce a vertical stack of said units, and means to raise one edge of the top row of said stack of units from the next lower row and to move said top row to one side of said stack to remove said top units from said stack and to transport said removed units from said stack.

2. A device for dividing a block of product including means to horizontally divide a block of product into units to produce a vertical stack of said units, means to sequentially raise said stack with the top units of the stack at a given level, and means to raise one edge of the top row of said stack of units from the next lower row when said top row of units are at said level and to move said top row to one side of said stack to remove the top units from said stack and transport said removed units from said stack.

3. A device for dividing a block of product including means to horizontally divide a block of product into units to produce a vertical stack of said units, means to sequentially raise said stack with the top units of the stack at a given level, and means at said level to move said top units at said level from said stack horizontally to one side of said stack.

4. A device for dividing a block of product including means to horizontally divide a block of product into units to produce a vertical stack of said units, means to sequentially raise said stack with the top units of the stack at a given level, a conveyor having a conveying surface positioned adjacent said level, and means to sequentially remove the top units from said stack and to deposit the removed units on said conveying surface.

5. A device for dividing a block of product including an antifriction conveyor to support a block of product, horizontal cutting means positioned above said conveyor adjacent an end thereof, a pusher means to move said block along said conveyor through said cutting means to produce a vertical stack of units of product, and means to raise one edge of the top row of said stack of units from the next lower row and to move said top row to one side of said stack to remove said top units from said stack and to transport said removed units from said stack.

6. A device for dividing a block of product including an antifriction conveyor to support a block of product, horizontal cutting means positioned above said conveyor adjacent an end thereof, a pusher means to move said block along said conveyor through said cutting means to product a vertical stack of units of product, a second antifriction conveyor positioned to the other side of said cutting means from the first conveyor and at about the same level as said first conveyor whereby as said blocks leave said cutting means they will be received on said second conveyor, stack raising means to sequentially raise said second conveyor after a stack of units are received thereon, and means to sequentially remove the top units from said stack after each sequential raise of said second conveyor.

7. A device for dividing a block of product including an antifriction conveyor to support a block of product, horizontal cutting means positioned above said conveyor adjacent an end thereof, a pusher means to move said block along said conveyor through said cutting means to produce a vertical stack of units of product, a second antifriction conveyor positioned to the other side of said cutting means from the first conveyor and at about the same level as said first conveyor whereby as said blocks leave said cutting means they will be received on said second conveyor, stack raising means to sequentially raise said second conveyor after a stack of units are received thereon to position the top units at a given level, a pusher at said level and movable in a generally horizontal line to push the top units from said stack, and power means operatively connected to said stack raising means and to said pusher to sequentially move said pusher and said stack raising means.

8. A device for dividing a block of product including means to horizontally divide a block of product into units to produce a vertical stack of said units, antifriction means at one side of said stack, means adjacent said antifriction means to receive said blocks, a pusher at the other side of said stack to push the top unit from said stack across said antifriction means and onto the last mentioned means, and means to raise the stack after the top units have been removed therefrom.

9. A device for dividing a block of product including means to horizontally divide a block of product into units to produce a vertical stack of said units, a plurality of spaced conveyors at one side of said stack, a first antifriction means positioned between said conveyors, mounting means attached to said antifriction means to raise and lower said antifriction means, a second antifriction means between said conveyors and said stack, stack raising means to position the top units of said stack at about the level of said antifriction means, a pusher at the other side of said stack at a level to intersect the top units when the units are so positioned, and power means operatively connected to said mounting means, said stack raising means, and said pusher to sequentially position said stack, to actuate said pusher and said mounting means to push the top units onto the first antifriction means, and to actuate said mounting means to lower said units onto said conveyors.

10. A device for dividing a block of product including means to horizontally divide a block of product into units to produce a vertical stack of said units, means to sequentially raise said stack with the top units of the stack at a given level, and means at said level to slide below the top units and to tip the top units from the stack.

11. A device for dividing a block of product including an antifriction conveyor to support a block of product, horizontal cutting means positioned above said conveyor adjacent an end thereof, a pusher means to move said block along said conveyor through said cutting means to produce a vertical stack of units of product, a second antifriction conveyor positioned to the other side of said cutting means from the first conveyor and at about the same level as said first conveyor whereby as said blocks leave said cutting means they will be received on said second conveyor, stack raising means to sequentially raise said second conveyor after a stack of units are received thereon to position the top units at a given level, a third conveyor beyond said second conveyor and at about said level, and means at said level to slide below the top units and to tip the top units from said stack onto said third conveyor.

12. A device for dividing a block of product including means to horizontally divide a block of product into units to produce a vertical stack of said units, a guide at each end of said stack, a yoke having two ends movably mounted in said guides and a center portion having a knife-like blade at a side of said stack in a generally horizontal position, said guides being pivotally mounted adjacent the other side of said stack, stop means associated with said guides and said yoke to limit the movement of the yoke in the guides in the direction of said other side of the stack, actuating means attached to the yoke above the blade, stack raising means, and power means connected to said stack raising means to sequentially raise the stack and position the bottom of the top unit in line with said blade and to the actuating means to move the yoke toward said other side to insert the blade under the top units and to pivot the guides and yoke upwardly as said stop means prevent further movement of the yoke in the guides whereby the top units are tipped from the top of the stack.

13. The method of handling blocks of product including the steps of cutting a block horizontally into a stack of a plurality of units, at a given level moving the top unit from the stack to one side of the stack, raising the stack until the following unit is at said level, moving said following unit from the stack to said side, and repeating the last two steps for each of the remaining units in the stack.

14. The method of handling blocks of product including the steps of cutting a block horizontally into a stack of a plurality of units, at a given level pushing the top unit from the stack to one side of the stack, raising the stack until the following unit is at said level, pushing said following unit from the stack to said side, and repeating the last two steps for each of the remaining units in the stack.

15. The method of handling blocks of product including the steps of cutting a block horizontally into a stack of a plurality of units, at a given level tipping the top unit from the stack to one side of the stack, raising the stack until the following unit is at said level, tipping said following unit from the stack to said side, and repeating the last two steps for each of the remaining units in the stack.

References Cited in the file of this patent
UNITED STATES PATENTS

| Number | Name | Date |
|---|---|---|
| 273,176 | Smith | Feb. 27, 1883 |
| 567,438 | Alexander | Sept. 8, 1896 |
| 732,221 | Potvin | June 30, 1903 |
| 854,823 | Hedrich | May 28, 1907 |
| 1,131,626 | Gurney | Mar. 9, 1915 |
| 2,200,513 | Mitchel et al. | May 14, 1940 |
| 2,200,514 | Mitchel et al. | May 14, 1940 |